US012589386B2

(12) United States Patent
Schmid

(10) Patent No.: US 12,589,386 B2
(45) Date of Patent: Mar. 31, 2026

(54) PIPETTING METHOD AND PIPETTING DEVICE

(71) Applicant: TECAN TRADING AG, Mannedorf (CH)

(72) Inventor: Noa Schmid, Kriens (CH)

(73) Assignee: TECAN TRADING AG, Mannedorf (CH)

( * ) Notice: Subject to any disclaimer, the term of this patent is extended or adjusted under 35 U.S.C. 154(b) by 199 days.

(21) Appl. No.: 17/853,192

(22) Filed: Jun. 29, 2022

(65) Prior Publication Data

US 2022/0323949 A1 Oct. 13, 2022

Related U.S. Application Data

(62) Division of application No. 16/348,690, filed as application No. PCT/EP2017/079216 on Nov. 14, 2017, now Pat. No. 11,400,445.

(30) Foreign Application Priority Data

Nov. 15, 2016 (WO) ................ PCT/EP2016/077778

(51) Int. Cl.
*B01L 3/02* (2006.01)
*G01N 35/10* (2006.01)

(52) U.S. Cl.
CPC .......... *B01L 3/021* (2013.01); *G01N 35/1016* (2013.01); *G01N 35/1072* (2013.01);
(Continued)

(58) Field of Classification Search
None
See application file for complete search history.

(56) References Cited

U.S. PATENT DOCUMENTS

2002/0011276 A1 1/2002 Sander
2003/0049861 A1 3/2003 Woodward
(Continued)

FOREIGN PATENT DOCUMENTS

EP 2489992 A1 8/2012
JP 2007101486 A 4/2007
(Continued)

OTHER PUBLICATIONS

International Search Report and Written Opinion for corresponding PCT application No. PCT/EP2017/079216, mailed Feb. 15, 2018.

*Primary Examiner* — Matthew D Krcha
*Assistant Examiner* — Brittany I Fisher
(74) *Attorney, Agent, or Firm* — Notaro, Michalos & Zaccaria P.C.

(57) ABSTRACT

A method is disclosed for controlling at least one of aspirating and of dispensing a liquid dose or of producing a liquid dose in a pipette or in receptacle, the method having the steps of first loading a first pipette with a first working medium at a first pressure having a first sign with respect to a reference pressure, thereby dispensing the liquid dose into the receptacle or aspirating the liquid dose into the first pipette, second loading a second pipette with a second working medium at a second pressure having a second sign with respect to the reference pressure, thereby dispensing the liquid dose into the receptacle or aspirating the liquid dose into the second pipette, discharging a pressure in the first working medium through a controlled valve arrangement to the reference pressure between first and second loadings. A pipetting device is also disclosed.

19 Claims, 7 Drawing Sheets

Figure 1:
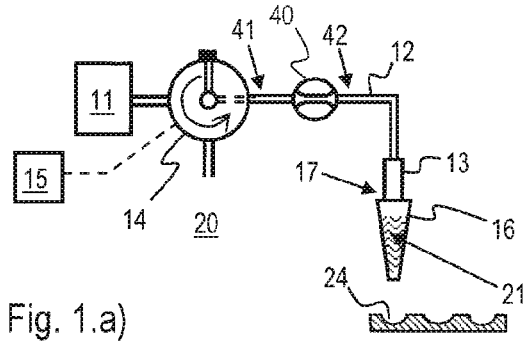
Figure 1:
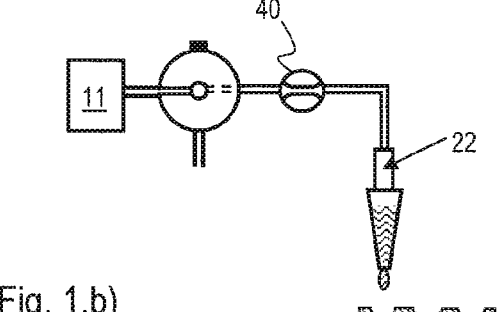
Figure 1:
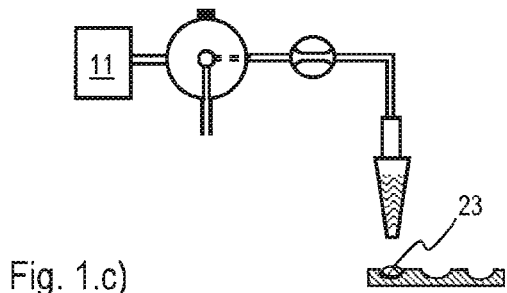
Figure 1:
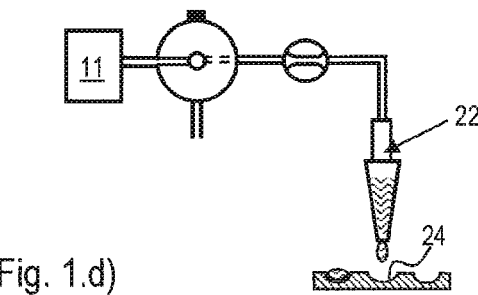

(52) U.S. Cl.
CPC ... *B01L 2300/14* (2013.01); *B01L 2400/0622*
(2013.01); *B01L 2400/086* (2013.01)

(56)                    References Cited

U.S. PATENT DOCUMENTS

| | | | |
|---|---|---|---|
| 2005/0159716 A1 | 7/2005 | Kobayaashi et al. | |
| 2006/0258011 A1* | 11/2006 | Shvets | B01L 13/02 |
| | | | 436/49 |
| 2009/0301231 A1* | 12/2009 | Wang | B41J 2/175 |
| | | | 73/864.11 |
| 2012/0328487 A1* | 12/2012 | Saito | G01N 35/1002 |
| | | | 141/1 |
| 2013/0108521 A1 | 5/2013 | Ikushima | |
| 2013/0220037 A1* | 8/2013 | White | G01N 35/1016 |
| | | | 73/864.81 |
| 2017/0130187 A1* | 5/2017 | Lee | B01L 3/502738 |

FOREIGN PATENT DOCUMENTS

| | | |
|---|---|---|
| WO | 2010084208 A2 | 7/2010 |
| WO | 2013052318 A1 | 4/2013 |

\* cited by examiner

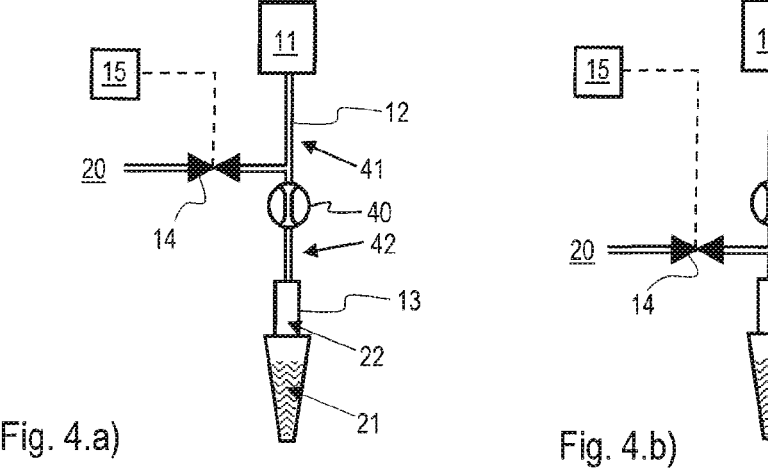
Fig. 4.a)
Fig. 4.b)
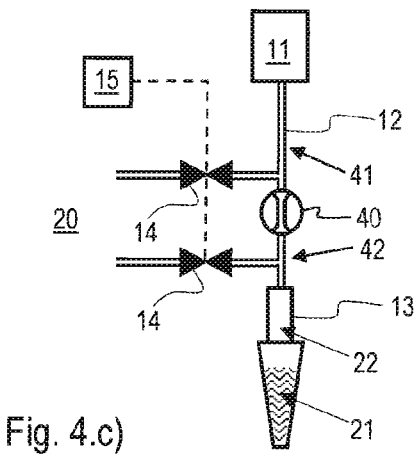
Fig. 4.c)

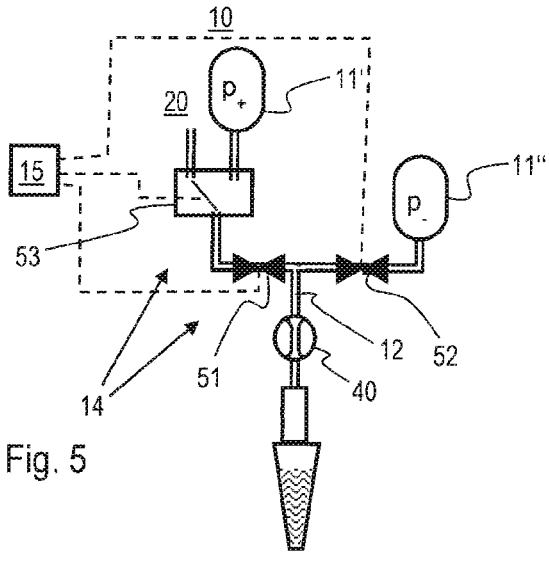
Fig. 5
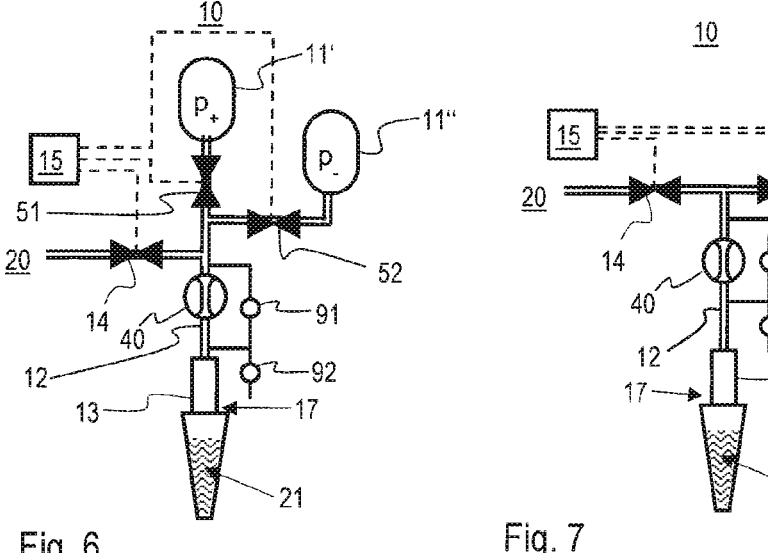
Fig. 6                          Fig. 7

PIPETTING METHOD AND PIPETTING DEVICE

RELATED APPLICATION

This patent application is a divisional of U.S. patent application Ser. No. 16/348,690, filed on May 9, 2019, which claims priority on PCT/EP2017/079216 filed Nov. 14, 2017, which claims priority on PCT/EP2016/077778 filed Nov. 15, 2016, for which the whole content thereof being incorporated into the present application by explicit reference for any purpose.

The invention addressed herein relates to a method of controlling at least one of aspirating and of dispensing a liquid dose or of producing a liquid dose in a pipette or in receptacle. Under further aspects, the invention relates to a pipetting device.

In the field of liquid handling, it is common practice to use pipettes to aspirate and dispense a liquid. Such a liquid may e.g. be a chemical product or a sample of a bodily fluid. One type of pipetting devices is the so-called air displacement pipette. When using this type of pipette, a defined volume of a working medium, in this case air, is loaded into the pipette or removed from the pipette. Thereby a pressure on one side of the liquid in a pipette is decreased or increased with respect to reference pressure, such that a force results, which drives the liquid out of the pipette or into the pipette. We understand throughout the present description and claims under "a pipette" a tubular member with one opening for aspiration and release of a liquid product dose and in addition, with a second opening whereat aspirating with under-pressure or dispensing with over-pressure, respectively, is controllably applied.

In fields as for example pharmaceutical research, clinical diagnostics and quality assurance, highly automated facilities for the handling, processing and analyzing of liquids are in use. In such facilities, pipetting devices often play a central role in producing liquid doses of a predetermined amount and in transporting doses of liquid between different stations for processing or for analyzing the liquid. Accuracy and precision of the produced liquid doses is of large importance. In general, rapid processing is desired. This can be achieved by parallel handling of liquid doses or by applying fast repetition rates.

From the publication WO 2010/084208 a pipetting arrangement is known which comprises at least two sets of pipettes, whereby each set of pipettes is operationally connected via a controllable ON/OFF-(open/closed) valve to a common aspiration port. This way, at least two sets of pipettes, can share one pumping arrangement, in particular one precision pumping arrangement.

The object of the present invention is to provide an alternative method of controlling at least one of aspirating and of dispensing a liquid dose or of producing a liquid dose in a pipette or in receptacle.

This object is achieved by a method according to claim 1.

The method according to the invention is a method of controlling at least one of aspirating and of dispensing a liquid dose or of producing a liquid dose in a pipette or in receptacle.

The method comprises the step of first loading a first pipette with a first working medium at a first pressure having a first sign with respect to a reference pressure, wherein an amount of the first working medium flows across a flow restriction towards or away from the first pipette, thereby dispensing the liquid dose into the receptacle or aspirating the liquid dose into the first pipette.

The method comprises the step of second loading a second pipette with a second working medium at a second pressure having a second sign with respect to the reference pressure, thereby dispensing the liquid dose into the receptacle or aspirating the liquid dose into the second pipette.

Further, the method comprises discharging a pressure in said first working medium through a controlled valve arrangement to the reference pressure between said first and said second loadings.

Surprisingly, the step of discharging a pressure in said first working medium through a controlled valve arrangement to the reference pressure has the effect that the liquid doses produced by the method achieve accurately the amount of liquid and the amount of liquid is highly reproducible. Thereby, the reproducibility is not affected by the preceding steps, such as the number of preceding aspirating or dispensing steps already performed with the same pipette or another pipette before starting the method for producing the liquid dose. Furthermore, the step of discharging a pressure in said first working medium through a controlled valve arrangement to the reference pressure has the effect that the smallest volume that can be aspirated in a controlled way is significantly lowered compared to a method without this step of discharging.

Here, we use the term 'loading' to comprise loading positive pressure as well as loading negative pressure (i.e. applying under-pressure or vacuum). The term 'loading' shall not imply a direction of flow of a medium. Stated differently, during the 'loading', working medium may flow towards the pipette or away from the pipette.

The first and/or the second working medium may be a liquid or a gaseous fluid. In both cases, a container with a working medium having reference pressure may be provided for discharging a positive or negative pressure, i.e. for receiving excess working medium or providing working medium to be loaded to the pipette.

In one embodiment of the method according to the invention, which may be combined with any of the embodiments still to be addressed unless in contradiction, the working medium is a gaseous medium and/or the reference pressure is ambient pressure.

The first and/or the second gaseous medium may e.g. be air. It is conceivable as well, to use another gas, e.g. nitrogen, helium, argon, or another inert gas, if oxidation or other chemical reactions of the liquid to be handled with the gaseous medium are of concern. The reference pressure may be ambient pressure. A working medium being a gaseous medium may be brought directly in contact with ambient air for discharging a pressure. The working medium may have undergone a particle filtering step. Particularly in the case of a working medium being air, humidity of the working medium may be controlled.

In one embodiment of the method according to the invention, which may be combined with any of the embodiments still to be addressed unless in contradiction, there is at least one of the following valid:

a) said first and second loadings are equal;
b) the first and second loadings are different;
c) said first pipette is said second pipette;
d) said first and second pipettes are different pipettes
e) the absolute value of said first pressure is equal to the absolute value of said second pressure;
f) the absolute value of said first pressure is different from the absolute value of said second pressure;
g) said first sign is equal to said second sign;
h) said first sign is opposite said second sign;

i) said first working medium is equal to said second working medium;

j) said first working medium is different from said second working medium.

Several loadings may be applied to the same pipette. The second loading may as well be applied to another pipette, e.g. another pipette connected to a manifold connecting a single pressure source with a set consisting of several pipettes. In both cases, the second loading starts with more clearly defined pressure conditions, after the discharging of pressure in the working medium. Different loadings with a working medium at a first or second pressure may comprise loadings at positive and negative pressure, as well as different absolute values of pressure. During a pipetting process a switch in composition of the working medium may occur, e.g. from air being the first working medium to nitrogen being the second working medium. In this case, the step of discharging a pressure in said first working medium through a controlled valve arrangement to the reference pressure accelerates the replacement of the first working medium. In this case, a sequence of loading and discharging steps may be applied to quickly decrease the remaining oxygen level in the system.

In another embodiment of the method according to the invention, which may be combined with any of the preaddressed embodiments and any of the embodiments still to be addressed unless in contradiction, the method comprises establishing an intermediate time span between said first and said second loadings, in particular wherein said intermediate time span is variable, and performing said discharging during a discharge time span, whereby said discharge timespan is shorter than said intermediate timespan, in particular wherein the step of discharging is executed as a discharge burst of the working medium.

In another embodiment of the method according to the invention, which may be combined with any of the preaddressed embodiments and any of the embodiments still to be addressed unless in contradiction, the pressure is applied in steps.

With this embodiment, any desired time course of the pressure in the first or second working medium is achievable.

In another embodiment of the method according to the invention, which may be combined with any of the preaddressed embodiments and any of the embodiments still to be addressed unless in contradiction, a pressure pulse having a sign inverse to the first sign is applied to the first working medium before discharging the pressure.

With this embodiment, a very fast return to reference pressure is possible. Even a sign change in the pressure applied is possible, whereby a change in the direction of movement of the liquid can be enforced, e.g. for releasing a drop at the end of a dispensing step.

In another embodiment of the method according to the invention, which may be combined with any of the preaddressed embodiments and any of the embodiments still to be addressed unless in contradiction, a sequence of the first loading and the second loading is repeated, selecting subsequent intermediate time spans to be equal or to vary.

The intermediate time span may be fixedly programmed into the time controller or the time span may be made dependent on conditions occurring during the pipetting process.

In another embodiment of the method according to the invention, which may be combined with any of the preaddressed embodiments and any of the embodiments still to be addressed unless in contradiction, the method being a method for producing a liquid dose in a pipette, the method comprises the steps of (a) dipping one of the first and second pipette's tip into a liquid, (b) loading the one pipette with a respective working medium at a respective one of the first and second pressures with the respective one of the first and second signs being negative, thereby aspirating the liquid dose into the pipette, (c) confining the volume of the respective working medium.

The confining of the volume of the respective working medium at the end of the aspirating step has the effect that the liquid dose produced in the pipette is held in the pipette, i.e. dripping out of the pipette is prevented.

In another embodiment of the method according to the invention, which may be combined with any of the preaddressed embodiments and any of the embodiments still to be addressed unless in contradiction, the method being a method for producing N liquid doses in at most N receptacles, the method comprises the steps of (a) providing a liquid in the first pipette;

(b) performing the first loading with a first sign being positive thereby dispensing a first liquid dose into a first receptacle;

(c) selecting said second pipette being the first pipette, the second sign being equal to the first sign, the second working medium being the first working medium and performing the second loading, thereby dispensing a further liquid dose into a further receptacle; and repeating for N−1 times step (c), performing the discharging between subsequent loadings.

With this embodiment, a reliable method of multiple dispensing from a single pipette is made available. The discharging steps between the single dispensing steps have the effect that the amount of liquid doses produced in each dispensing step is accurate and reproducible and independent of the number of preceding dispensing steps.

Particularly in the case of aspirating once and then dispensing N equal doses, it is an often observed fact that the volume of the first portion is different from the stable volume reached after a longer series of dispensing steps. A known solution for this problem is to discard e.g. the first portion. Particularly in the case of low numbers of portions, such as 2 to 4 portions needed, the fraction of discarded liquid is significant. The increased reproducibility achieved by the application of the discharging steps between subsequent loadings according to the embodiment of the method, i.e. in this case the application of discharging steps between subsequent dispensing steps of a multi-dispense sequence, reduces the need to discard the first portion, which consequently reduces the amount of wasted liquid and may improve the efficiency of processes.

In another embodiment of the method according to the invention, which may be combined with any of the preaddressed embodiments and any of the embodiments still to be addressed unless in contradiction, the method being a method for producing a liquid dose in a pipette, the method comprises the steps of (a) dipping the first pipette's tip into a liquid, (b) loading the first pipette with the first working medium at the first pressure with the first sign being negative, thereby aspirating liquid into the pipette, (c) selecting the second pipette being the first pipette, the second sign being equal to the first sign and performing the second loading.

With this embodiment, a method with succession of several aspirating steps is provided.

In another embodiment of the method according to the invention, which may be combined with any of the preaddressed embodiments and any of the embodiments still to be addressed unless in contradiction, the method being a method for producing a liquid dose in a receptacle, the method comprises the steps of (a) dipping the first pipette's tip into a liquid;

(b) loading the first pipette with a working medium at the first pressure with the first sign being negative thereby aspirating the liquid dose into the pipette;

(c) moving the first pipette over a receptacle;

(d) selecting the second pipette being the first pipette and performing the second loading with a second sign being positive thereby dispensing the liquid dose into the receptacle.

This embodiment of the method provides a "suck-and-spit" method, i.e. a method of producing a liquid dose by aspirating a liquid dose followed by dispensing the same liquid dose into a receptacle.

The pipetting device according to the invention is a pipetting device for a liquid driven by a working medium. The pipetting device comprises at least one pipette connector adapted to releasably attach a pipette at a pipette side of the pipette connector. The at least one pipette connector has an opening towards the pipette side. To each pipette connector, a pipette may be attached when the pipetting device is in use. The pipetting device comprises at least one positive and/or negative pressure source. The pipetting device further comprises a flow connection between the opening of the at least one pipette connector and the at least one pressure source. The pipetting device comprises a flow restriction, preferably a capillary, which is arranged in the flow connection between the opening of the pipette connector and the pressure source. The flow restriction separates the flow connection into an upstream portion and a downstream portion with respect to the flow restriction. Further, the pipetting device has a controllable discharge valve arrangement from the flow connection to reference pressure. The pipetting device finally comprises a time controller. The time controller is operationally connected to the controllable discharge valve arrangement. The operational connection allows to control the timing of the opening and closing of the valves comprised in the valve arrangement. The controllable discharge valve arrangement provides the possibility to discharge a pressure in a working medium to reference pressure. For use with a gaseous working medium the flow connection may be built as a gas flow connection. The controllable discharge valve arrangement may be designed to selectively establish a connection from the flow connection to ambient, reference pressure being defined by ambient pressure in this case.

A pipetting device with features as defined in the present invention has the advantage that it allows to aspirate small volumes in a reproducible way. The minimum volume to be aspirated may be selected significantly lower than with a similar pipetting device not having a controllable discharge valve arrangement. This advantage is important for single-pipetting of small volumes, such as volumes smaller than 5 microliters. Surprisingly, variations of the minimum aspirateable volume and variations in effectively aspirated volume dependent from individual valves (i.e. from production tolerance of the valves) may be reduced as well, in a pipetting device according to the present invention. This advantage is particularly relevant in multi-channel pipetting devices, wherein each pipetting channel has its own set of valves.

With the pipetting device according to the present invention, a defined pressure may be applied at the beginning of a defined time span, whereby the volume flow of the working medium is defined by the properties of the flow restriction and the pressure applied. Thus, the amount of liquid aspirated into the pipette or dispensed from the pipette can be controlled in very precise way by controlling the time span.

With the flow restriction being a capillary, the dependence of the flow rate on the pressure difference is very linear, which helps to achieve high precision in the volume of the produced liquid doses.

The flow restriction may be e.g. a glass capillary, in particular a fused silica capillary. The flow restriction may be built as micro-channel, e.g. a laser structured micro-channel. The volume of the downstream portion with respect to the flow restriction may be kept as small as possible.

The pipette connector may be adapted to releasably attach a pipette, which is a so-called disposable tip, e.g. made of a plastic material such as polypropylene. Such disposable tips may be plugged onto a conical section of the pipette connector. The pipette connector may be adapted to releasably attach a pipette, which ends in a hollow needle made of metal, such as e.g. stainless steel, and which may be releasably attached to the pipette connector by means of a swivel nut or a screw.

In an embodiment of the pipetting device according to the invention, which may be combined with any of the embodiments still to be addressed unless in contradiction, the time controller comprises a pulse generator the output thereof being operationally connected to a control input of the discharge valve arrangement.

In another embodiment of the pipetting device according to the invention, which may be combined with any of the preaddressed embodiments and any of the embodiments still to be addressed unless in contradiction, the controllable discharge valve arrangement comprises a two-way valve and/or a switching valve, preferably a fast switching valve having a switching time in the millisecond range, in particular a rotary valve.

A valve having a response time of less than 3 milliseconds may be used in the controllable discharge valve arrangement. Response times of approximately 1.6 milliseconds may be achieved with directly switching magnet valves, which are normally closed by means of a spring, and which are opened by applying a current to a coil of an electromagnet. Increased current may be applied just at the beginning of the opening of the valve in order to achieve short response times. This type of valves has the further advantage that current flows only during the relatively short opening periods. This way power consumption as well as possibly disturbing heating of the working medium is kept at a low level.

In another embodiment of the pipetting device according to the invention, which may be combined with any of the preaddressed embodiments and any of the embodiments still to be addressed unless in contradiction, the pipetting device comprises at least one of a positive and of a negative pressure source with respect to reference pressure, preferably a respective pressure tank. The positive and the negative pressure sources may be constant pressure sources; in particular, they may be built as pressure tank of large volume or may comprise means for negative feedback control of the pressure.

With this embodiment, applying a positive or a negative pressure may simply and very quickly be performed by opening a valve in a flow connection leading to the respective pressure source.

In another embodiment of the pipetting device according to the invention, which may be combined with any of the preaddressed embodiments and any of the embodiments still to be addressed unless in contradiction, the pressure source comprises means for varying a pressure delivered by the at least one pressure source.

Such means for varying a pressure may e.g. be a piston pump.

In another embodiment of the pipetting device according to the invention, which may be combined with any of the preaddressed embodiments and any of the embodiments still to be addressed unless in contradiction, at least a further controllable valve is operationally interconnected between the pipette connector and the at least one pressure source.

A further controllable valve e.g. allows to close the connection to the at least one pressure source while performing the discharging of pressure to reference pressure. It further allows to close the connection for a time span, when another pressure source, e.g. with pressure of opposite sign, is connected to the pipette.

In another embodiment of the pipetting device according to the invention, which may be combined with any of the preaddressed embodiments and any of the embodiments still to be addressed unless in contradiction, the pipetting device comprises a positive pressure source and a negative pressure source, wherein a first controllable valve is operationally interconnected between the positive pressure source and the pipette connector and a second controllable valve is operationally interconnected between the negative pressure source and the pipette connector.

This embodiment has the advantage that extremely fast changes of the pressure conditions in the flow connection to the pipette may be achieved. The opening time intervals of the first and the second controllable valve may partially overlap, such that very fast transitions from positive to negative pressure or from negative pressure to positive pressure may be achieved. The first and the second controllable valves may be two-way valves. The first and the second controllable valves may be arranged adjacent to a common section of the flow connection. Such a common section of the flow connection may further be adjacent to the controllable discharge valve arrangement, which may be implemented as two-way valve, too. A common section of the flow connection may e.g. be in the upstream portion with respect to the flow restriction. Such a common section of the flow connection may e.g. have the form of a manifold with four arms, a first arm leading to the positive pressure source, a second arm leading to the negative pressure source, a third arm leading to the controllable discharge valve arrangement and a fourth arm leading to the flow restriction and further to the opening on the pipette side of the pipette connector. In such an arrangement, all three valves need to be switched with approximately equal frequency, such that all three valves have similar operating lifetimes. The controllable discharge valve arrangement, the first controllable valve and the second controllable valve may be operationally connected to the same time controller. They may be three valves of identical type. The valves may e.g. be direct switching magnet valves, which are normally closed, and which are opened by applying current to a coil.

In another embodiment of the pipetting device according to the invention, which may be combined with any of the preaddressed embodiments and any of the embodiments still to be addressed unless in contradiction, the controllable discharge valve arrangement is connected to at least one of the upstream portion of the flow connection and to the downstream portion of the flow connection.

With a controllable discharge valve arrangement being connected to the upstream portion of the flow connection, the pressure applied to the upstream side can be quickly released by discharging the pressure to reference pressure. The pressure that directly acts onto the liquid in the pipette may, depending on the dimension of the flow restriction and the amount of working medium in the pipette, the pipette connector and downstream portion of the flow connection, only decay slowly. In this case, a controllable discharge valve arrangement being connected to the downstream portion of the flow connection, helps to faster discharge the pressure from the pipette side of the flow restriction to reference pressure. A combination of the two controllable discharge valve arrangements may be most effective, however at the price of an additional valve.

Another embodiment of the pipetting device according to the invention, which may be combined with any of the preaddressed embodiments and any of the embodiments still to be addressed unless in contradiction, comprises a multiplicity of pipette connectors, each pipette connector being connected to a separate downstream portion of the flow connection with respect to a separate flow restriction.

With this embodiment it is possible to drive a multiple pipetting head with a single common pressure source. Simultaneous pipetting of a row of a well plate or of a complete well plate is possible with such a device. A pipetting head with, for example, rows of 4 or 8 pipette connectors or arrays of 24 (4×6), 96 (8×12), 384 (16×24) or 1536 (32×48) pipette connectors, preferably arranged corresponding to the positions of the wells of a standard well plate with the respective number of wells, is possible. In such a configuration, the number of expensive and/or voluminous parts such as piston pumps, valves and the like can be kept much lower than the number of pipette connectors, resulting in lower production cost and/or in a more compact design. With increasing number of pipette connectors, the total volume of the flow connection increases. In a pipetting head with a large number of pipette connectors, accuracy and reproducibility of the liquid volumes created benefit strongly from the effect of the discharge valve arrangement, as remaining pressure in the flow connection can be discharged efficiently. With this embodiment, if one pipette fails, e.g. because air is aspirated, or a pipette is clogged, due to the presence of the flow restriction in the branch of the failing pipette, this has only minor effects on the pressure conditions for all the other pipettes.

In another embodiment of the pipetting device according to the invention, which may be combined with any of the preaddressed embodiments and any of the embodiments still to be addressed unless in contradiction, the upstream portion of the flow connection comprises at a multiplicity of branches and/or a buffer tank.

This embodiment is particularly suited for a pipetting head with a large number of pipette connectors. In this embodiment, too, accuracy and reproducibility of the liquid volumes created benefit strongly from the effect of the discharge valve arrangement, as remaining pressure in the flow connection can be discharged efficiently also in the case when the flow connection is formed by a voluminous and/or complex manifold having a buffer tank and/or a multiplicity of branches. With this embodiment pressure conditions in the upstream portion as well as the total flow resistance from a pressure source to an individual pipette connector may be arranged to be the same for all pipette connectors in a simple way.

In another embodiment of the pipetting device according to the invention, which may be combined with any of the preaddressed embodiments and any of the embodiments still to be addressed unless in contradiction, the downstream portion of the flow connection is built as a flexible tube with an inner diameter smaller than or equal 1 mm.

This embodiment allows to have flow connection between a movable pipetting head with at least one pipette connector and a set of valves and flow restriction, which can be mounted in a fix position on the pipetting device. The small diameter of the flexible tube keeps the dead volume in the downstream portion of the flow connection low. A flexible tube with a length of up to 1 m may e.g. be possible in this embodiment, while still achieving high precision with regard to pipetted volumes. A multi-channel pipetting device having such a flexible tube with small inner diameter for each channel is conceivable as well. The downstream portion of the flow connection may be built as a flexible tube with an inner diameter as small as 0.75 mm or 0.5 mm.

The invention is further directed to a method of controlling at least one of aspirating and of dispensing a liquid dose or of producing a liquid dose in a pipette or in receptacle according to the method aspect of the invention by means of a pipetting device according to the device aspect of the invention.

Figure 2:
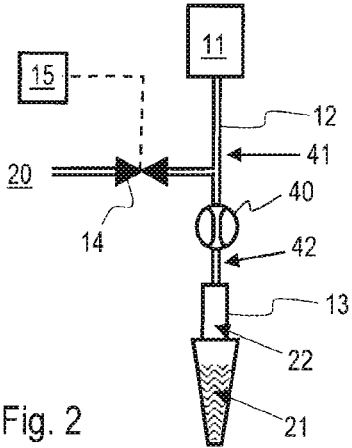
Figure 3:
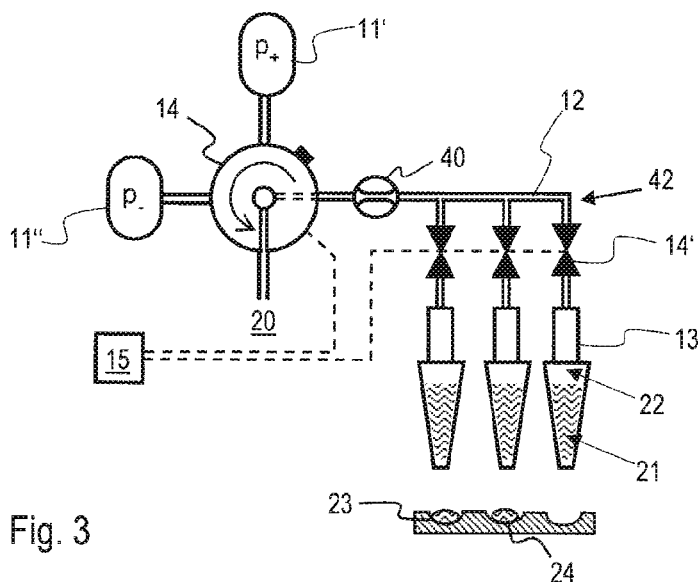
Figure 8:
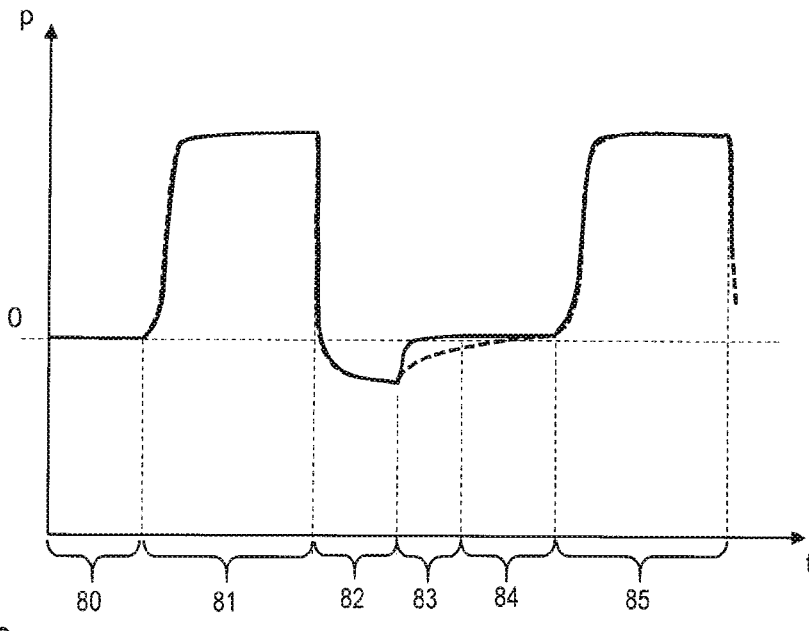
Figure 9:
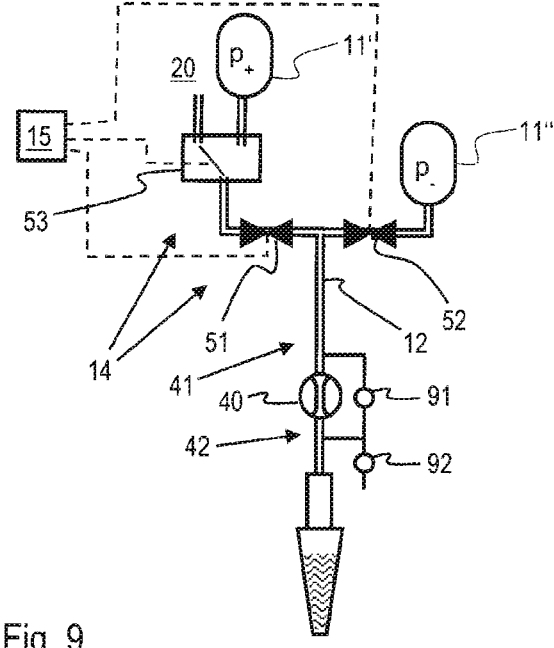
Figure 10:
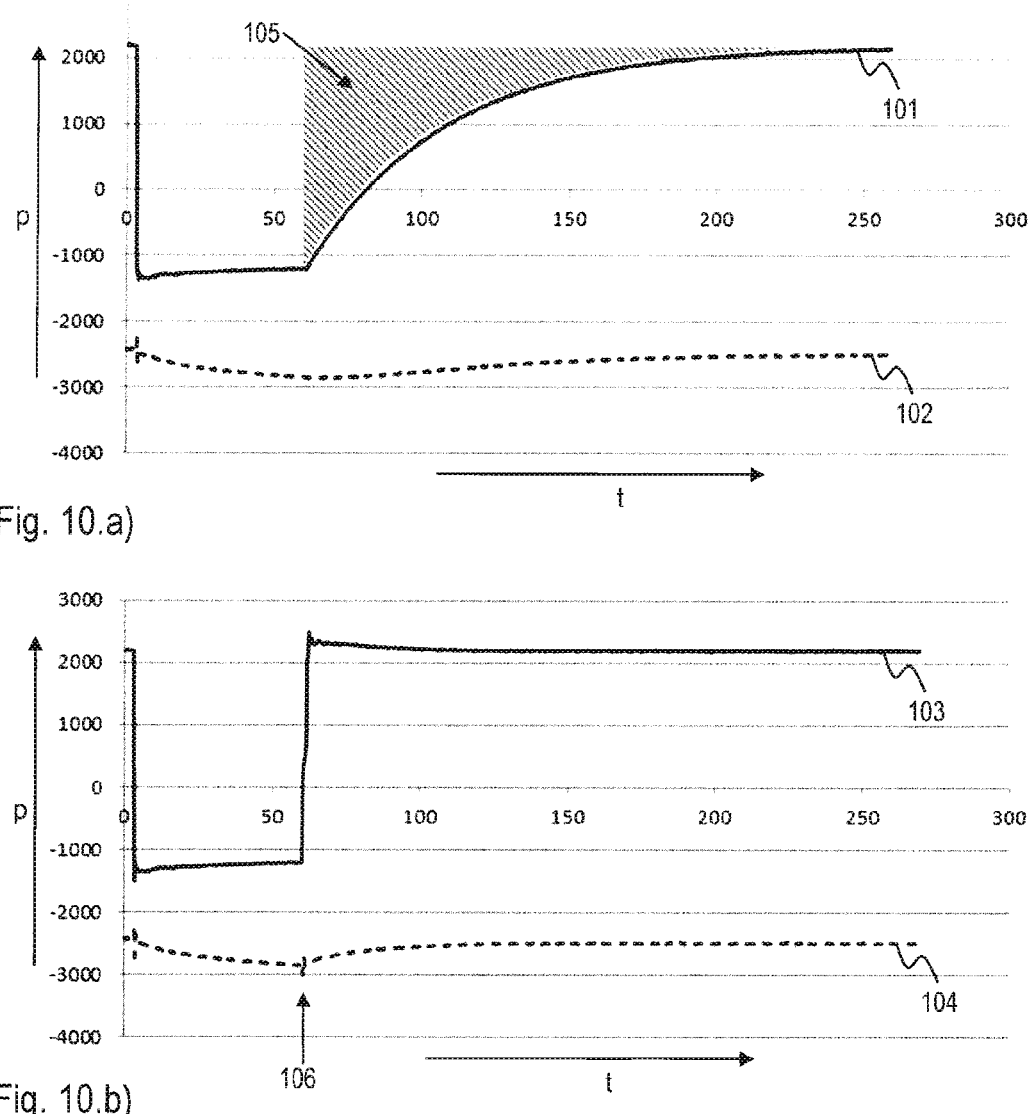
Figure 11:
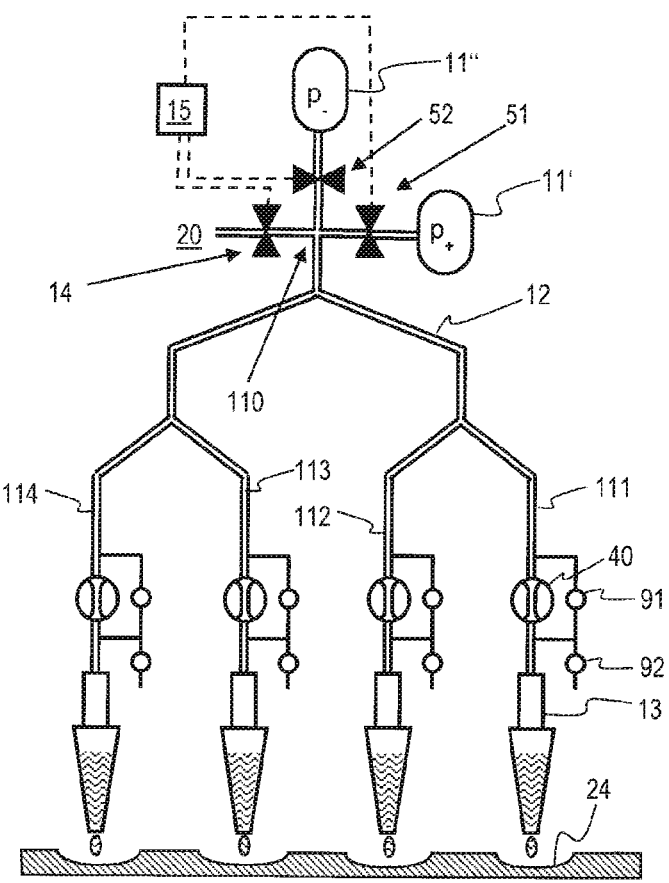

The invention shall now be further exemplified with the help of figures. The figures show:

FIGS. 1.*a*) to 1.*d*) show a schematic view of a pipetting device according to the invention in different states, while performing the method according to the invention;

FIG. 2 a schematic view of a pipetting device according to an embodiment;

FIG. 3 a schematic view of a pipetting device according to an embodiment;

FIGS. 4.*a*) to 4.*c*) show schematic views of the variants of an embodiment of a pipetting device having the flow restriction at different positions;

FIG. 5 a schematic view of a pipetting device according to an embodiment;

FIG. 6 a schematic view of a pipetting device according to an embodiment;

FIG. 7 a schematic view of a pipetting device according to an embodiment;

FIG. 8 schematically a course of a pressure in a pipette over time during the steps according to an embodiment of the method according to the invention;

FIG. 9 a schematic view of a pipetting device according to an embodiment;

FIGS. 10.*a*) to 10.*b*) show a comparison of two different time courses of measured pressure during aspirating;

FIG. 11 a schematic view of pipetting device according to an embodiment.

FIG. 1.*a*) shows schematically and simplified, a pipetting device according to the invention. The pipetting device here is shown in a state ready to be used to produce a liquid dose in a receptacle 24. A liquid 21 is provided in a pipette 16 placed over the receptacle. A working medium 22 fills a part of the pipette that is in fluid connection with a controllable discharge valve arrangement 14, which is here designed as a rotational valve. The rotational valve has a connecting part that is rotatable as indicated by an arrow. The time controller 15 controls the position of this connecting part. The time controller is not shown anymore in FIGS. 1.*b*) to 1.*d*). The connecting part is currently in a position that is closed, i.e. the working medium is confined. The rotational valve can be switched to establish fluid connection either to a pressure source 11 or to reference pressure 20. The pipette connector 13 has an opening 17 towards the pipette side of the pipette connector. A flow restriction 40 is arranged in the flow connection 12. The flow restriction 40 separates the flow connection 12 into an upstream portion 41 and a downstream portion 42 with respect to the flow restriction.

FIG. 1.*b*) shows the pipetting device after the rotational valve has been switched to establish fluid connection between the pressure source 11 and the pipette 16. Thereby, the pipette is loaded with a working medium 22 at a pressure having in this case a positive sign with respect to reference pressure. An amount of the working medium flows across the flow restriction 40 towards the pipette. This way, a drop of liquid is pushed out of the tip of the pipette.

FIG. 1.*c*) shows the pipetting device after the rotational valve has been switched to establish fluid connection from the working medium to reference pressure 20, thereby discharging a pressure in the working medium through the controlled valve arrangement to reference pressure.

FIG. 1.*d*) shows the pipetting device after the rotational valve has been switched again to establish fluid connection between the pressure source 11 and the pipette 16 leading to a second loading of the pipette with a working medium. In this case again, the pressure has a positive sign with respect to reference pressure, dispensing a second liquid dose into a second receptacle 24. Again, an amount of the working medium flows across the flow restriction 40 towards the pipette.

FIG. 2 shows a schematic view of a pipetting device according to an embodiment comprising one pipette 21. The pipette is attached to a pipette connector 13. A flow connection 12 provides a connection between the pipette connector 13 and a pressure source 11. In the flow connection 12 a flow restriction 40 is arranged between the pipette connector 13 and the pressure source 11. A working medium 22 is loaded into the pipette at a pressure determined by the pressure source. A controllable discharge valve arrangement 14 is formed by a two-way valve provided in an arm branching of the flow connection 12 and having an end portion in contact with reference pressure. The controllable discharge valve arrangement 14 is connected to the upstream portion 41 with respect to the flow restriction. A time controller 15 is operationally connected to the controllable discharge valve arrangement.

FIG. 3 shows a schematic view of a pipetting device according to an embodiment comprising a positive pressure source 11' and a negative pressure source 11", each being built as a pressure tank. The positive and the negative pressure sources may be constant pressure sources; in particular, they may be built as pressure tank of large volume or may comprise means for negative feedback control of the pressure. A rotational valve allows to selectively connect the pipette connector 13 to the positive pressure source 11', to the negative pressure source 11" or to reference pressure 20, as well as to confine the working medium in the flow connection 12 by bringing the rotational valve into a closed position. Several pipettes 16, in this case three pipettes, share a common flow connection 12 designed as a manifold having several arms. In every arm connecting a single pipette, a two-way valve is provided. Each of these two-way valves allows to selectively connect or disconnect the respective pipette to the rotational valve. A flow restriction 40 is arranged in the flow connection 12. More specifically, the flow restriction 40 is arranged in the section between the valve 14 and the point, where the flow restriction branches out into separate arms leading to the individual pipettes. I.e. the separate arms are in the downstream portion 42 with respect to the flow restriction. The time controller 15 is operatively connected to the two-way valves as well as to the rotational valve. This arrangement allows to selectively discharge pressure from a single pipette as well as from a set of pipettes or, in particular, of all pipettes together. This embodiment of the pipetting device may comprise a larger number of individually controllable pipetting channels, e.g. with 8 or 16 pipettes in a row, or arrays of 24, 96, etc. pipettes.

FIGS. 4.a) to 4.c) show schematic views of variants of an embodiment of a pipetting device comprising a flow restriction 40. In each variant, the flow restriction separates the flow connection 12 into an upstream portion 41 and a downstream portion 42 with respect to the flow restriction. In the variant shown in FIG. 4.a), an arm of the flow connection 12 branches of the upstream portion. A two-way valve is arranged in this arm. The two-way valve is operationally connected to a time controller 15, thus forming a controllable discharge valve arrangement 14 being connected to the upstream portion 41 of the flow connection 12. In the variant shown in FIG. 4.b), the controllable discharge valve arrangement 14 is connected to the downstream portion 42 of the flow connection 12. The variant shown in FIG. 4.c) comprises two two-way valves being controlled by the time controller 15, each for discharging the upstream portion 41 and the downstream portion 42 of the flow connection, respectively.

FIG. 5 shows a schematic view of a pipetting device according to an embodiment comprising a positive pressure source 11' and a negative pressure source 11", each of which is built as pressure tank. A flow connection 12 to a pipette connector 13 branches into two arms, one leading to the positive pressure source, the other leading to the negative pressure source. A two-way valve 51 and a two-way valve 52 are provided in each of the two arms. A third valve, being a switching valve 53 allows to selectively connect the first arm of the flow connection to either the positive pressure source 11' or to reference pressure 20. All three valves 51, 52, 53 mentioned above are operatively connected to a time controller 15, as indicated by dashed lines. The first two-way valve 51 and the switching valve 53 in combination form a controllable discharge valve arrangement 14. A flow restriction 40 is arranged in the flow connection 12.

FIG. 6 shows a schematic view of a pipetting device according to an embodiment similar to the embodiment shown in FIG. 5 also comprising a positive and a negative pressure source. The connection between the pipette connector 13 and each of the two pressure sources can be opened and closed individually by the two-way valves 51 and 52. In this embodiment, however, the controllable discharge valve arrangement 14 consists of a two-way valve that is arranged in a direct connection from the flow connection 12 to reference pressure. A flow restriction 40 is arranged in the flow connection 12. More specifically, the flow restriction 40 is arranged in the section of the flow connection between the branching off towards the controllable discharge valve arrangement 14 and the pipette connector 13. A pressure sensor 91 is on one side in fluid connection to the upstream portion with respect to the flow restriction and on its other side in fluid connection to the downstream portion with respect to the flow restriction. The pressure difference measured by pressure sensor 91 is an indication of the amount of working fluid passing across the flow restriction. A further pressure sensor 92 measures the pressure difference between the downstream portion and a reference pressure, e.g. atmosphere pressure.

FIG. 7 shows a schematic view of a pipetting device according to an embodiment comprising a pressure source 11 having means for varying the pressure delivered by the pressure source. The means for varying the pressure here is implemented as a piston pump. The flow connection 12 from the pressure source to the pipette connector 13 can be opened or closed by means of a first two-way valve 51 provided in the flow connection 12. A second two-way valve is arranged in a connection from the flow connection 12 to reference pressure 20. This second two-way valve is operatively connected to a time controller 15, thus forming a controllable discharge valve arrangement 14. The time controller 15 is further operatively connected to the first two-way valve and the piston pump in order to control time sequences of loading the pipette connector 13 as well as a pipette attached thereto with a working medium 22 having at a predetermined pressure. A flow restriction 40 is arranged in the flow connection 12. Pressure sensors 91 and 92 are arranged similar to the arrangement shown in FIG. 6.

FIG. 8 shows a possible course of a pressure in the pipette connector side of a pipette over time t during the steps according to an embodiment of the method according to the invention. The pressure course shown here is the pressure course in two successive dispensing steps from the same pipette. At the beginning, during time span 80, a liquid is already provided in the pipette, the pressure corresponds to the pressure being marked as 0 on the pressure axis p, corresponding approximately to reference pressure. During a first loading of the pipette with a working medium at a pressure above reference pressure, pressure in the pipette rises and liquid is dispensed from the pipette. This first loading occurs in time span 81. By applying a negative pressure pulse in time span 82, the dispensing is stopped quickly, and the release of a drop formed at the tip of the pipette is ensured. The negative pressure pulse has the side effect that pressure in the pipette falls below reference pressure. The following discharging step during time span 83, whereby the pressure of working medium is discharged through a controlled valve arrangement to reference pressure, leads to a return of the pressure in the pipette to approximately reference pressure. In fact, after the dispensing step, the pressure measured by pressure sensor 92 is slightly higher than before the dispensing step, as the amount of liquid in the pipette is reduced, thus leading to a change in hydrostatic pressure due to the reduced height of the liquid column present in the pipette. After an additional waiting time span 84 a second loading of the pipette with the working medium at a pressure above reference pressure is performed. In this case, the second pipette is identical to the first pipette and the second working medium is identical to the first working medium. The time spans 83 and 84 together form an intermediate time span between the first and second loadings. During the second loading, again a dispensing of a liquid dose takes place. Pressure plateaus reached in intervals 81 and 85 are the same, in case of an ideal pressure reservoir for the positive pressure source. This may be achieved by selecting a reservoir having a large volume in relation to the volumes dispensed. For comparison, a pressure course in dashed line is shown for a similar process, but without a discharging step during the time span 83. In the case of the pressure course without a discharging step, the pressure drifts over a longer time and in an uncontrollable way towards a stable pressure value, whereas in the case, when a discharging step is applied, a stable pressure value is established shortly after the end of time period 82. It is clearly visible that shortening the time 84 would lead to different conditions for the second dispensing step, in case that no discharging step is performed. Thus, the method according to the invention improves the reproducibility of pipetting results.

FIG. 9 shows a schematic view of a pipetting device according to an embodiment combining features of the embodiment shown in FIG. 5 in combination with pressure sensors 91 and 92. A controllable discharge valve arrangement 14 is connected to the upstream portion 41 of the flow connection 12. The controllable discharge valve arrangement 14 is formed by the combination of the two-way valve 51 and the switch valve 53. A pressure sensor 91 is arranged to measure a pressure difference between the upstream portion 41 and the downstream portion 42 of the flow connection, i.e. the pressure difference occurring over the flow restriction. This pressure difference is proportional to the flow of working medium through the flow restriction. A further pressure sensor 92 is arranged to measure a pressure difference between the downstream portion 42 of the flow connection and reference pressure 20. Signals from the two pressure sensors 91 and 92 may be used to increase the precision of the doses produced and to detected malfunctions in the pipetting process.

FIGS. 10.*a*) and 10.*b*) show time courses of the pressure measured in a pipetting device as shown e.g. in FIG. 6 or in FIG. 9 during an aspirating process. Time t is shown on a millisecond timescale and pressure p is in arbitrary units with an arbitrary offset. The pressure curves 101 and 103 shown as solid lines are pressure curves measured by the sensor 91, thus indicating a flow of the working medium through the capillary and correspondingly a flow of liquid into the pipette. The sign of the pressure axis p is such that the positive direction corresponds to a flow out of the pipette. The pressure curves 102 and 104 shown as dashed lines are pressure curves measured by the sensor 92. FIG. 10.*a*) shows the time course of the pressure without the step of discharging a pressure in the first working medium to reference pressure, whereas FIG. 10.*b*) shows the time course of the pressure with the step of discharging a pressure in the first working medium through a controlled valve arrangement to reference pressure, the discharging being applied starting at time 60 milliseconds, but otherwise with the same parameters as in FIG. 10.*a*). The start of discharging pressure to reference pressure is marked by reference sign 106. The comparison of the two pressure curves 101 and 103 clearly shows that the flow of liquid and working medium is stopped quicker and at a defined moment time, if the step of discharging pressure is applied. The area 105 marked by diagonal hatching corresponds to a time integral of flow, i.e. an aspirated volume. If the step of discharging the pressure in the first working medium to reference pressure is not applied, this volume, the size of which depends on the 'dead volume' between capillary and upstream valves, is unavoidably aspirated, i.e. it defines the minimum volume for single pipetting. With the timing as shown in FIG. 10.*a*), the aspirated volume corresponding to the area 105 is about half of the volume aspirated in total. By applying the step of discharging the pressure in the first working medium through a controlled valve arrangement to reference pressure, however, it becomes possible to aspirate much smaller volumes than this volume in a controlled way, as can be seen in FIG. 10.*b*). The pressure curve 103 displays a nearly rectangular form—here in the time between 0 and 60 milliseconds, which means, that the aspirated volume depends linearly on the aspirating time interval. As an example, without using a controllable discharge valve arrangement, minimal aspirated volumes in the range of 10 microliters may be achieved. By discharging a pressure in the working medium through a controlled valve arrangement according to a step of the present invention, this minimal aspirated volume may be brought down to 0.1 microliter. The effective numbers may depend on the pressures in the pressure sources and on the dead volumes in the flow connection.

A similar effect is achieved for dispensing.

An example with measured quantitative results is given in the following tables, Table 1 and Table 2. Aspirating steps similar to the ones displayed in FIG. 10.*a*) and FIG. 10.*b*) respectively have been performed on a pipetting device, wherein a dead volume in the downstream portion with respect to the flow restriction is defined by a tube having an inner diameter of 0.5 millimeter and a length of 1 meter. A disposable tip having a volume of 200 microliters has been used. The negative pressure source was held at a pressure of 250 mbar, i.e. at about 750 mbar below reference pressure. Opening times of the valve to achieve seven different aspirating times (see column "AspTime") 30 ms, 20 ms, 18 ms, 16 ms, 14 ms, 12 ms and 10 ms have been applied. Each aspirating time has been used in four pipetting steps with a discharge step according to the invention (Table 1), i.e. similar to FIG. 10.*b*), and in four pipetting steps without a discharging step (Table 2), i.e. similar to FIG. 10.*a*). Effectively aspirated volumes have been measured gravimetrically.

TABLE 1

| (with discharging step) | | | | |
|---|---|---|---|---|
| AspTime [ms] | AspVol with Discharge Valve [µl] | | | Mean [µl] |
| 30 | 6.99 | 6.94 | 6.95 | 6.96 | 6.96 |
| 20 | 1.9 | 1.9 | 1.95 | 1.91 | 1.92 |
| 18 | 1.54 | 1.54 | 1.54 | 1.52 | 1.54 |
| 16 | 1.15 | 1.17 | 1.15 | 1.18 | 1.16 |
| 14 | 0.7 | 0.74 | 0.73 | 0.72 | 0.72 |
| 12 | 0.18 | 0.17 | 0.17 | 0.32 | 0.21 |
| 10 | 0.1 | 0.08 | 0.07 | 0.08 | 0.08 |

TABLE 2

| (without discharging step) | | | | |
|---|---|---|---|---|
| AspTime [ms] | AspVol no Discharge Valve [µl] | | | Mean [µl] |
| 30 | 16.83 | 16.79 | 16.81 | 16.84 | 16.82 |
| 20 | 12.4 | 12.37 | 12.39 | 12.22 | 12.35 |
| 18 | 11.66 | 11.83 | 12.06 | 11.94 | 11.87 |
| 16 | 11.5 | 11.88 | 11.57 | 11.48 | 11.61 |
| 14 | 11.35 | 11.6 | 11.47 | 11.32 | 11.44 |
| 12 | 10.76 | 11.01 | 10.69 | 10.87 | 10.83 |
| 10 | 10.76 | 10.62 | 10.6 | 10.69 | 10.67 |

Comparison of Table 1 and Table 2 shows that the minimum volume that may be aspirated is drastically reduced from about 10 microliters achievable without applying a discharging step to about 0.08 microliters achievable with applying the discharging step.

FIG. 11 shows a further embodiment of the pipetting device. Here the flow connection 12 is built as a manifold that has a multiplicity of branches 111, 112, 113, 114. Each branch connects a pipette connector 13 to a common pressure source. Each branch leads through a flow restriction of its own, such that each of a multiplicity of pipette connectors is connected to a separate downstream portion of the flow connection with respect to a separate flow restriction. A simultaneous dispensing with all four pipette tips connected to the pipette connectors into four wells 24 is shown as an example of possible use of this embodiment. Each branch is equipped with pressure sensors 91, 92 arranged around the flow restriction, as already discussed in the context of FIG. 9. In this configuration, the pressure sensors may be used to detect clogging of individual pipettes, erroneous aspiration of air or other types of malfunction of an individual pipette tip. The connection between the pipette connector 13 and a positive pressure source 11' and a negative pressure source 11" can be opened and closed individually by the two-way valves 51 and 52. The controllable discharge valve arrangement 14 comprises a two-way valve that is arranged in a direct connection from the flow connection 12 to reference pressure 20, which in this case is given by the pressure in the environment of the pipetting device. The three two-way valves are controlled by the time controller 15. The flow connection is built as a manifold that branches out tree-like on two hierarchical levels, doubling the number of branches on each level. The individual branches are arranged such that the travel distance of the working medium from a central distribution port 110 to each flow restriction 40 is equal for all branches. This way, the timing of the pipetting process is not disturbed by distance dependent delays on individual branches.

A structure of branches similar to the one shown in FIG. 11 and having equal travel distance on each branch may e.g. constructed for a 4×4 array of pipette tips by a first four-fold branching leading to the centers of 2×2 sub-arrays followed by a second four-fold branching connecting the individual flow restrictions. Six 4×4 block of this type may be combined to a 96-pipette head with an array of 8×12 pipette connectors arranged corresponding to the positions of the wells of a 96-well-plate. If each 4×4 block uses three two-way valve arranged as schematically shown in FIG. 11, a 96-pipette head may be built with only 18 controllable two-way valves.

In the following, a workflow for the valve operations in an embodiment of the method is explained, whereby a pipetting device according to the embodiment as shown in FIG. 5 is used for performing the method. The workflow describes an aspirate step followed by a dispense step. In the dispense step a negative pressure pulse is used for drop release.

Aspirate, performed with pipette tip in liquid:
switch valve 53 to reference pressure (e.g. atmospheric pressure);
open valve 52, starts aspirating liquid into the pipette;
close valve 52;
open valve 51 for 5 milliseconds, this leads to discharging the negative pressure and stops aspirate;
close valve 51, now the working medium above the liquid in the pipette is confined, such that the liquid is held in the pipette.

In order to quickly stop aspirating, the step of closing valve 52 may as well fall into the opening period of valve 51, such that discharging the negative pressure very sharply defines the end of aspirating and defines the pressure state in the pipette connector, too.

Dispense, performed with pipette tip over receptacle:
switch valve 53 to positive pressure source;
open valve 51, starts dispensing liquid;
close valve 51;

open valve 52, drop release by drawing liquid backward;
close valve 52;
switch valve 53 to reference pressure;
open valve 51, discharges remaining pressure to reference pressure.

In order to achieve steep flanks in the time course of the pressure in the pipette connector and fast switch over times, the step of closing the valve 52 may as well be performed at the end of the above sequence, i.e. shortly after opening the valve 51 to discharge remaining pressure to reference pressure 20.

LIST OF REFERENCE SIGNS

10 pipetting device
11 pressure source
11', 11" positive/negative pressure source
12 flow connection
13 pipette connector
14 controllable discharge valve arrangement
14' further valve
15 time controller
16 pipette
17 opening of pipette connector (at pipette side)
20 reference pressure
21 liquid
22 working medium
23 liquid dose
24 receptacle
40 flow restriction
41 upstream portion (of flow connection)
42 downstream portion (of flow connection)
51 two-way valve
52 two-way valve
53 switching valve
80 time span before first loading
81 time span during first loading
82 time span during negative pressure pulse
83 time span during discharging of pressure to reference pressure
84 time span of waiting
85 time span during second loading
91 pressure sensor (difference over capillary)
92 pressure sensor (difference to reference pressure)
101 pressure curve (measured during aspirating)
102 pressure curve (measured during aspirating)
103 pressure curve (measured during aspirating)
104 pressure curve (measured during aspirating)
105 area (corresponding to an aspirated volume)
106 start of discharging pressure to reference pressure
110 central distribution port
111, 112, 113, 114 branches of the flow connection
P pressure
p+ positive pressure
p− negative pressure
t time

The invention claimed is:

1. A pipetting device for a liquid driven by a working medium, the pipetting device comprising
   at least one pipette connector (13) adapted to releasably attach a pipette at a pipette side of the pipette connector and having an opening (17) towards said pipette side,
   at least one positive and/or negative pressure source (11, 11', 11"),
   a flow connection (12) between said opening (17) of the at least one pipette connector and said at least one pressure source, a flow restriction (40) in a form of a capillary or a micro-channel, being arranged in the flow connection between said opening (17) of the pipette connector (13) and said pressure source (11, 11', 11"), separating the flow connection into an upstream portion (41) and a downstream portion (42) with respect to the flow restriction, a controllable discharge valve arrangement (14) configured to discharge a pressure in a working medium in said flow connection to a reference pressure (20), wherein the reference pressure (20) is ambient pressure, and a time controller (15) operationally connected to said controllable discharge valve arrangement, wherein the time controller comprises a pulse generator the output thereof being operationally connected to a control input of said discharge valve arrangement.

2. The pipetting device according to claim 1, wherein the pressure source comprises a piston pump for varying a pressure delivered by said at least one pressure source.

3. The pipetting device according to claim 1, wherein at least a further controllable valve (51, 52) is operationally interconnected between the pipette connector and the at least one pressure source.

4. The pipetting device according to claim 1, wherein the controllable discharge valve arrangement (14) is connected to at least one of the upstream portion (41) of the flow connection and to the downstream portion (42) of the flow connection.

5. The pipetting device according to claim 1, comprising a multiplicity of pipette connectors (13), each pipette connector being connected to a separate downstream portion (42) of the flow connection with respect to a separate flow restriction (40).

6. The pipetting device according to claim 5, wherein the upstream portion (41) of the flow connection (12) comprises a multiplicity of branches and/or a buffer tank.

7. The pipetting device according to claim 1, wherein said downstream portion (42) of said flow connection (12) is built as a flexible tube with an inner diameter smaller than or equal 1 mm.

8. The pipetting device according to claim 1, wherein the controllable discharge valve arrangement comprises a two-way valve (51, 52).

9. The pipetting device according to claim 1, wherein the controllable discharge valve arrangement comprises a fast switching valve having a switching time in the millisecond range.

10. The pipetting device according to claim 9, wherein the fast switching valve is a rotary valve.

11. The pipetting device according to claim 1, comprising a positive pressure source (11') with respect to the reference pressure that is a pressure tank.

12. The pipetting device according to claim 1, comprising a negative pressure source (11") with respect to the reference pressure that is a pressure tank.

13. The pipetting device according to claim 1 comprising at least one of a positive (11') and of a negative pressure source (11") with respect to reference pressure.

14. The pipetting device according to claim 1 comprising a positive pressure source (11') and a negative pressure source (11"), wherein a first controllable valve (51) is operationally interconnected between said positive pressure source and said pipette connector and a second controllable valve (52) is operationally interconnected between said negative pressure source and said pipette connector.

15. The pipetting device according to claim 1, wherein the controllable discharge valve arrangement (14) is configured to discharge the pressure through an opening different from the opening (17) of the pipette connector (13) or different from a pipette attached to the pipette connector (13).

16. A pipetting device for a liquid driven by a working medium, the pipetting device comprising at least one pipette connector (13) adapted to releasably attach a pipette at a pipette side of the pipette connector and having an opening (17) towards said pipette side, at least one of a positive pressure source (11') and of a negative pressure source (11") with respect to a reference pressure (20), a flow connection (12) between said opening (17) of the at least one pipette connector and said at least one pressure source, a flow restriction (40) in a form of a capillary or a micro-channel, being arranged in the flow connection between said opening (17) of the pipette connector (13) and said pressure source (11, 11', 11"), separating the flow connection into an upstream portion (41) and a downstream portion (42) with respect to the flow restriction, a controllable discharge valve arrangement (14) configured to discharge a pressure in a working medium in said flow connection to the reference pressure (20), a time controller (15) operationally connected to said controllable discharge valve arrangement, and wherein the time controller comprises a pulse generator the output thereof being operationally connected to a control input of said discharge valve arrangement.

17. A pipetting device for a liquid driven by a working medium, the pipetting device comprising at least one pipette connector (13) adapted to releasably attach a pipette at a pipette side of the pipette connector and having an opening (17) towards said pipette side, at least one of a positive pressure source (11') and of a negative pressure source (11"), a flow connection (12) between said opening (17) of the at least one pipette connector and said at least one pressure source, a flow restriction (40) in a form of a capillary or a micro-channel, being arranged in the flow connection between said opening (17) of the pipette connector (13) and said pressure source (11, 11', 11"), separating the flow connection into an upstream portion (41) and a downstream portion (42) with respect to the flow restriction, a controllable discharge valve arrangement (14) configured to discharge a pressure in a working medium in said flow connection to a reference pressure (20), a time controller (15) operationally connected to said controllable discharge valve arrangement, and wherein a first controllable valve (51) is operationally interconnected between said positive pressure source and said pipette connector and a second controllable valve (52) is operationally interconnected between said negative pressure source and said pipette connector.

18. A pipetting device for a liquid driven by a working medium, the pipetting device comprising:

at least one pipette connector (13) adapted to releasably attach a pipette at a pipette side of the pipette connector and having an opening (17) towards said pipette side, at least one positive and/or negative pressure source (11, 11', 11"), a flow connection (12) between said opening (17) of the at least one pipette connector and said at least one pressure source, a flow restriction (40) in a form of a capillary or a micro-channel, being arranged in the flow connection between said opening (17) of the pipette connector (13) and said pressure source (11, 11', 11"), separating the flow connection into an upstream portion (41) and a downstream portion (42) with respect to the flow restriction, a controllable discharge valve arrangement (14) configured to discharge a pressure in a working medium in said flow connection to a reference pressure (20), wherein the reference pressure (20) is ambient pressure, and a time controller (15) operationally connected to said controllable discharge valve arrangement, and wherein the controllable discharge valve arrangement (14) is configured to discharge the pressure through an opening different from the opening (17) of the pipette connector (13) or different from a pipette attached to the pipette connector (13).

19. The pipetting device according to claim 18, wherein the time controller comprises a pulse generator the output thereof being operationally connected to a control input of said discharge valve arrangement.

\* \* \* \* \*